United States Patent
Hakala et al.

(10) Patent No.: US 6,229,277 B1
(45) Date of Patent: May 8, 2001

(54) METHOD AND APPARATUS FOR THE DAMPING OF MOTOR VIBRATIONS

(75) Inventors: Harri Hakala, Hyvinkää ; Esko Aulanko, Kerava; Panu Kurronen, Hyvinkää, all of (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/331,321

(22) PCT Filed: Dec. 19, 1997

(86) PCT No.: PCT/FI97/00822

§ 371 Date: Jul. 7, 1999

§ 102(e) Date: Jul. 7, 1999

(87) PCT Pub. No.: WO98/26643

PCT Pub. Date: Jun. 25, 1998

(30) Foreign Application Priority Data

Dec. 19, 1996 (FI) .......................................... 965136

(51) Int. Cl.[7] .............................. H02P 5/162; H02P 2/00; H02P 7/628; G05B 1/02
(52) U.S. Cl. .......................... 318/629; 318/696; 318/685; 318/432
(58) Field of Search .................................... 318/138, 139, 318/245, 254, 439, 560–696

(56) References Cited

U.S. PATENT DOCUMENTS

| | | |
|---|---|---|
| 4,115,726 | 9/1978 | Patterson et al. . |
| 5,124,625 * | 6/1992 | Wakabayashi ....................... 318/603 |
| 5,283,510 | 2/1994 | Tamaki et al. . |
| 5,359,269 | 10/1994 | Wedeen et al. . |
| 5,481,142 * | 1/1996 | James et al. ........................... 310/51 |
| 5,847,943 * | 12/1998 | Vogel ..................................... 363/37 |
| 5,872,440 * | 2/1999 | Brabant et al. ...................... 218/686 |
| 5,920,983 * | 7/1999 | Murakoshi et al. .................... 29/825 |
| 6,040,676 * | 3/2000 | Nordquist et al. .................... 318/696 |
| 6,064,172 * | 5/2000 | Kuznetsov ........................... 318/716 |

OTHER PUBLICATIONS

Electronic Machines and Drives, Gordon R. Slemon, University of Toronto, 1992, ISBN 0–201–57885–9, chapter 10.7.

* cited by examiner

Primary Examiner—Paul Ip

(57) ABSTRACT

A method and an apparatus for damping the vibrations of an alternating current motor is provided. The motor is supplied from an alternating current source with a supply voltage whose frequency is the basic frequency. Additionally the motor is fed with a second voltage having a frequency equal to the basic frequency multiplied by the quantity $2*m*q-1$. In the equation, m is the number of the phases of the motor and q is the number of slots per phase.

14 Claims, 3 Drawing Sheets

US 6,229,277 B1

METHOD AND APPARATUS FOR THE DAMPING OF MOTOR VIBRATIONS

This application is the national phase under 35 U.S.C. §371 of prior PCT International Application No. PCT/FI97/00822 which has an International filing date of Dec. 19, 1997 which designated the United States of America.

BACKGROUND OF THE INVENTION

The present invention relates to a and to an apparatus for damping vibration of an m-phase alternating-current motor.

The moment of an AC machine is generated by the voltage supplied to the armature circuit, normally a stator, and magnetisation of the excitation circuit, normally a rotor. The supply voltage is fed into the stator windings, which are fitted in slots in the stator. Magnetisation is developed by means of permanent magnets or excitation windings fitted in the rotor. The smoothness of motor operation depends on how closely the magnetic field developed in the air gap of the motor approaches the sinusoidal form. The harmonic components of a non-sinusoidal curve form produce moments that result in mechanical vibration and noise, the frequency of such moments depending on the frequency of said components.

Besides being dependent on the frequency of the supply voltage, the form of the air gap field also depends on the form of the field produced by excitation, among other things. Moreover, in machines with a small number of slots per phase and field pole, the so-called slot-harmonic field produced by the current flowing in each slot is stronger. For example, in a three-phase machine with one slot per phase, the six-fold supply frequency is a problem.

SUMMARY OF INVENTION

An object of the invention is to achieve a solution for substantially reducing the vibration and noise produced by the harmonic moments of a motor. To implement this, the procedure of the invention includes feeding the motor with a second voltage having a frequency equal to the basic frequency multiplied by a quantity 2. Correspondingly, the apparatus of the invention is characterized by apparatus to produce the above function.

In the solution of the invention, a field is generated in the air gap at a frequency that compensates the largest deviation from the sinusoidal curve form produced by the supply frequency. Therefore, the overall curve form of the air gap field approaches the sinusoidal form, resulting in a smooth moment. By suitably selecting the amplitude of a second voltage fed into the motor, an appropriate degree of compensation is achieved. In particular, the moment of a slot frequency corresponding to a six-fold supply frequency is compensated with a frequency equalling five times the supply frequency when the number of slots per phase is one. Accordingly, a slot harmonic corresponding to a twelve-fold supply frequency is compensated with an 11-fold frequency.

Especially in axial motors in which a large moment is to be generated at a maximal distance from the axis of rotation, the moment produced by slot harmonics can be substantially reduced.

According to a preferred embodiment of the invention there is a phase shift between the first and the second voltage. Further according another preferred embodiment the phase shift is controlled on the basis of the load of the motor and the voltage reference. For each load it can be found a phase shift where the vibration moment generated by the harmonics has its minimum value. With this embodiment the vibration is minimized when the load is changing.

Yet in another preferred embodiment the amplitude of the second voltage is controlled on the basis of the load. The required amlitude is small when the load is low and the required amplitude increases when the load increases.

According to a preferred embodiment, the moment curve of the motor is measured for a normal supply voltage and, based on this measurement, the moment of the second voltage compensating the harmonics is determined.

In another embodiment, the moment curve is measured continuously and the amplitude of the second voltage is determined based on this.

The supply of the second voltage is preferably implemented by adding to the modulation frequency of the frequency converter generating the motor supply voltage a component corresponding to the frequency of the second voltage.

According to yet another embodiment, the second voltage is fed at a phase shift relative to the supply voltage, allowing the moment compensation to be applied with a maximal accuracy.

DESCRIPTION OF THE PREFERRED EMBODIMENTS

Figure 1:
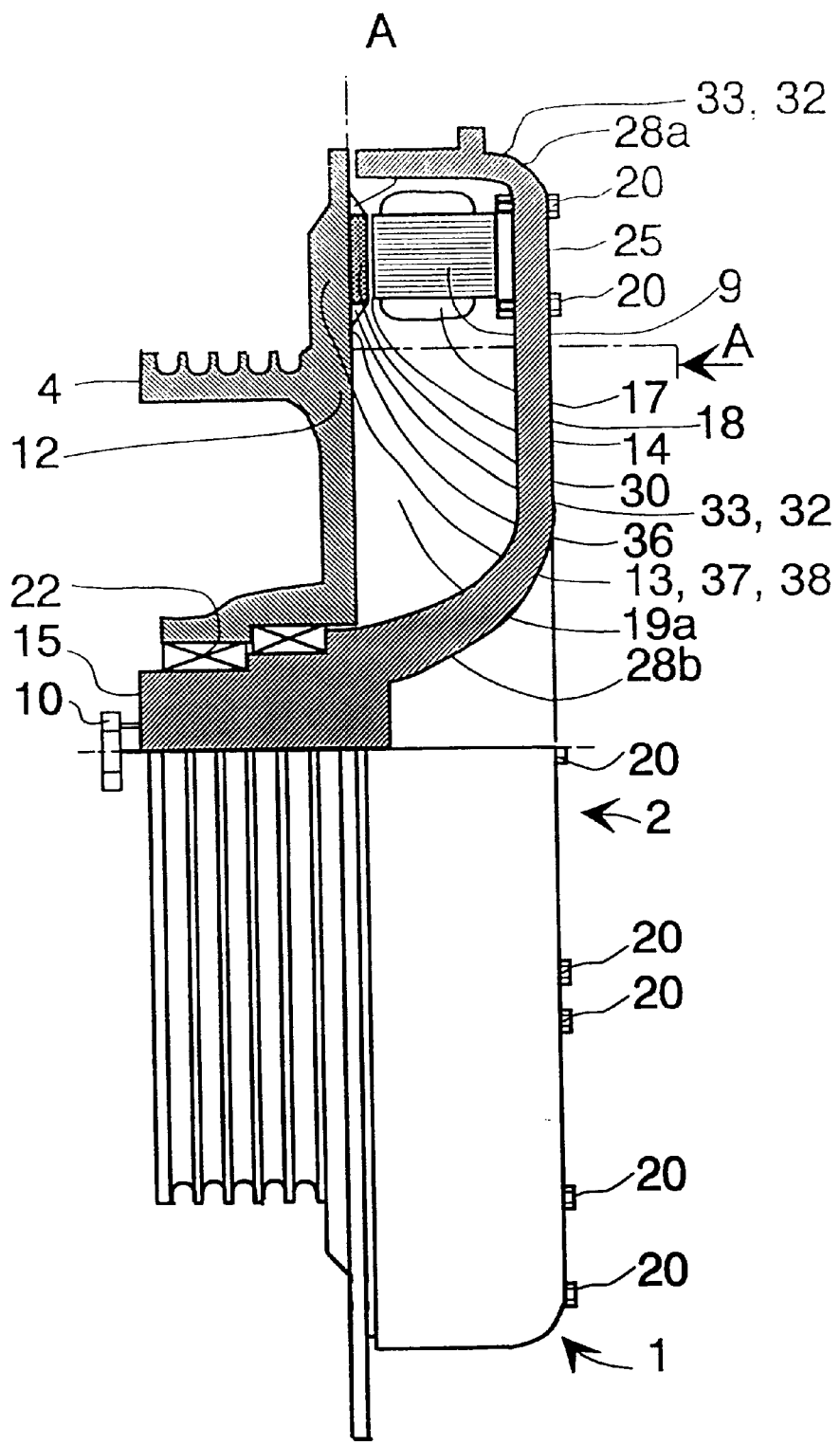
FIG. 1 presents a synchronous motor with an axial air gap, controlled by the method of the invention.

FIG. 1 shows a side view of an ungeared elevator machine 1 partially sectioned, provided with a discoid motor 2 and a traction sheave 4 for driving the elevator ropes (not shown). The motor 2 is e.g. a synchronous motor. The machine achieves a very high efficiency, about 85%, so the machine and the motor remain colder during operation.

To render the figure more readable, the dimensions in the longitudinal direction of the motor axle 15 are presented in a magnified form. The main parts of the motor 2 are the rotor 13 and the stator disc 18 together with the axle 15. The rotor 13 comprises a rotor disc 12 together with permanent magnets and a traction sheave attached to it.

The permanent magnets 30 are placed in succession on the surface 36 of the rotor disc 12 to form a ring-like circle. That part of the rotor disc 12 which lies under the permanent magnets 30 functions both as magnetic circuit 38 and supporting structure 37 of the rotor disc 12. The permanent magnets may be of different shapes and they can be divided into component magnets 31 placed side by side or one after the other. The component magnets 31 may be e.g. of a rhomboid shape.

The permanent magnets 30 are protected against external particles by an ring-shaped cage formed by the stator disc 18. The traction sheave 4 is integrated with the rotor disc 12 or it may also be a separately attached part. The diameter of the traction sheave is smaller than the diameter of the circle formed by the permanent magnets 30. The rotor disc can advantageously be manufactured by integrating the rotor disc and traction sheave into a single structure.

The spaces 39 between the rotor disc 12 and the permanent magnets 30 on it and the corner 32 between the permanent magnets can be at least partially filled with a non-magnetic filler material 33, such as polymerised resin. Ferromagnetic particles as well as common dirt may gather in the corners, and the filler is intended to prevent the formation of sharp corners and pits in the magnetic circuit. Particles can be more easily removed from planar surfaces and surfaces with gentler corners.

The stator disc 18 comprises a ring-like cavity 19 which is open on one side and whose outer ring-like wall 28a is directed towards the rotor disc 12 while its inner wall 28b is attached to the axle 15. Between walls 28a and 28b is a wall 25 directed towards the axle 15. The cavity with its walls can be characterized by the words 'cage, cage-like'. The stator 9 comprises a stator pack of stampings and stator windings 17. The stator is of a ring-like shape and it is placed near the outer ring-like wall 28a. The stator is fixed to the wall 25 of the cavity 19 perpendicular to the axle by means of fixing elements, preferably screws. If desirable, the stator can be fixed to any one of the cavity walls.

Between the permanent magnets 30 and the stator 9 there is an air gap 14, whose plane is substantially perpendicular to the axle 15 of the motor 2. Thus, the air gap may also be of a slightly conical shape.

The stator disc 18 and the axle 15 are also integrated into a single part, but naturally, they can also be separate parts that are only attached to each other. Bearings 22 are provided between the rotor disc 12 and the stator disc 18.

Figure 2:
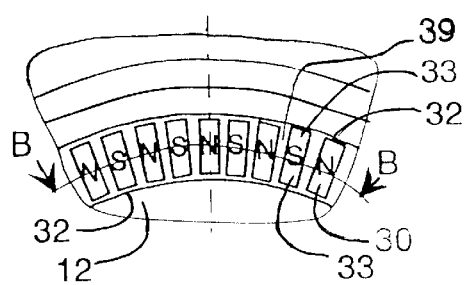
FIG. 2 presents section A—A of FIG. 1.

FIG. 2 presents section A—A of FIG. 1, showing part of the circle formed by rectangular permanent magnets. The magnets can preferably be made up of two component magnets, so that each magnet 30 consists of two rhomboidal component magnets placed one upon another. The component magnets are homopolar, i.e. the poles of the component magnets N and S are oriented in the same direction in each magnet 30. The number of component magnets in one magnet may of course be other than two. By using component magnets, it is possible to influence the shape of the magnetic field and the magnets are easier to handle and mount than when a single larger magnet 30 is used.

Figure 3:
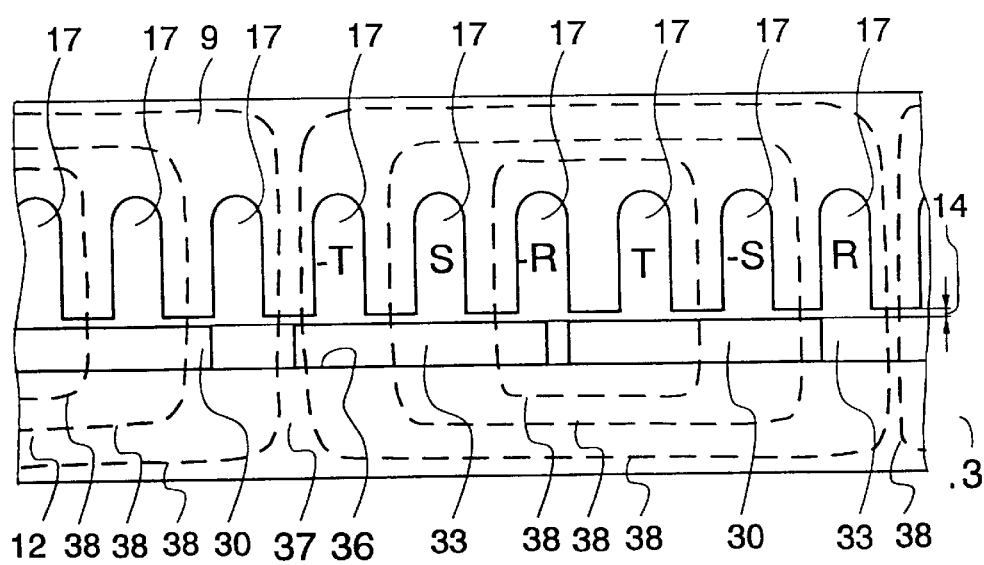
FIG. 3 presents section B—B of FIG. 2.

FIG. 3 presents section B—B of FIG. 2 opened out into a straight plane. The figure also shows part of the stator windings 17 with the corresponding phase designations R, S and T. Unsigned designations indicate conductors going down towards the plane of the paper while designations with a—sign indicate conductors coming up from it. The magnetic field 38 is directed from the permanent magnet 30 (N pole) across the air gap 14 to the stator 9, from where it turns back again across the air gap 14 towards a permanent magnet 33 with opposite polarity (S pole) and then passes inside the rotor disc 12 back to the permanent magnet 30. That part of the rotor disc through which the magnetic field 38 passes, besides acting as a part of the magnetic circuit, also functions as a supporting structure 37 of the rotor disc 12, transmitting the moment of the brake disc to the traction sheave 4. When the traction sheave is integrated with the brake disc, part of the traction sheave may also function as a part of the magnetic circuit when the traction sheave is located close to the permanent magnets. In this embodiment, the number q of slots per phase is 1, so the slot frequency is 6*supply frequency, the coefficient (=6) being determined as the product of the number of phases (=3), the number of polarities (=2) of the poles and the number of slots per phase q(=1).

Figure 4:
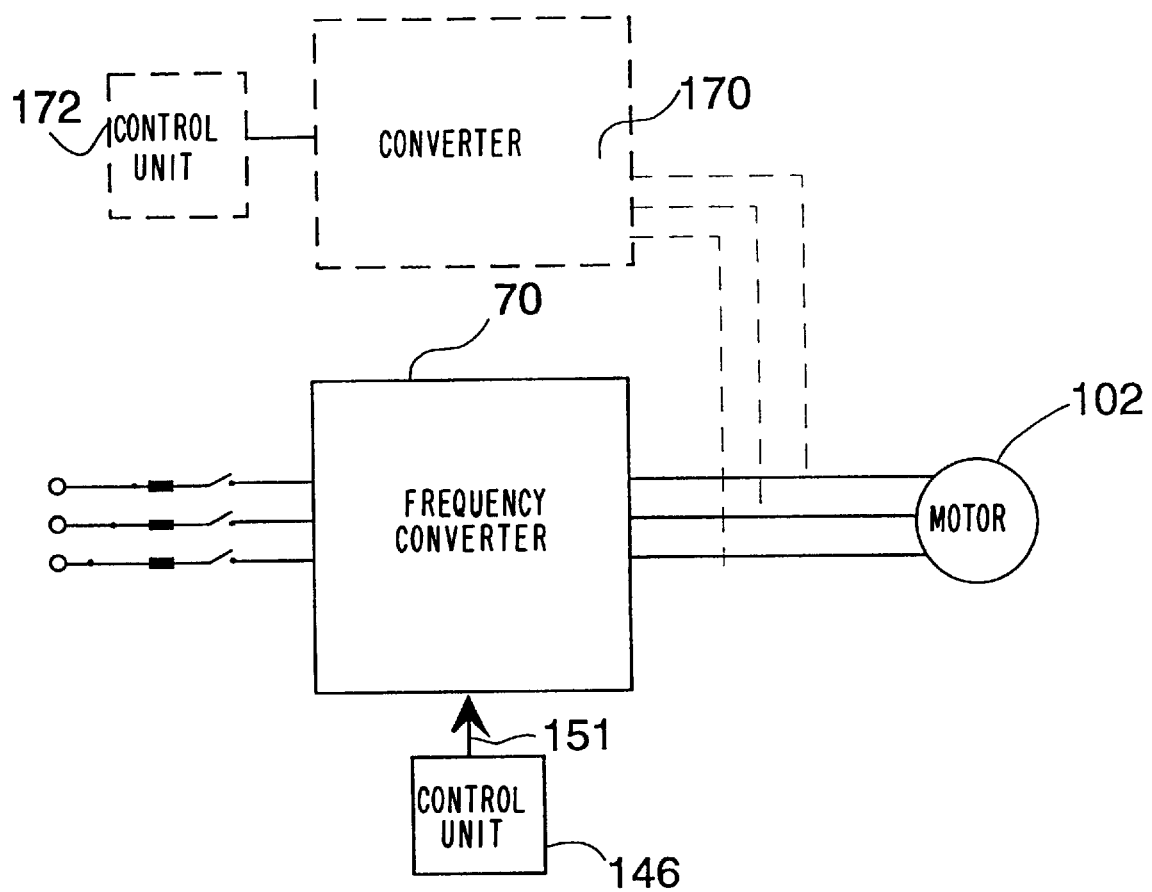
FIG. 4 presents a control circuit for controlling the motor by the method of the invention.

FIG. 4 presents an embodiment for implementing motor control according to the invention. In this embodiment, a synchronous motor 102 is fed by a frequency converter 70 connected between the supply network and the motor 102. The frequency converter 70 is controlled by a control unit 146, which generates control pulses, which are passed via conductors 151 to the switches of the frequency converter 70. In an embodiment in which the frequency converter generating the supply voltage is modulated by having the second voltage connected to the basic frequency, the control unit contains a corresponding modulating part. If the second voltage is generated by a separate converter 170, then this is provided with a separate control unit 172, which produces the second frequency.

For each load it can be found a value for the phase shift between the first and the second voltage and a value for the amplitude of the second voltage which minimize the vibration moment generated by the harmonics. These values can measured beforehand and then stored in the memory wherefrom they can be read when the motor is driving by different loads. This comes from the fact that there is a straight correlation between the load and the voltage with pole angle of the motor and that one of the causes of the vibration is clearly dependent on the pole angle. The measuring of the pole angle is also possible but it requires additional components.

The invention has been described above by the aid of some of its embodiments. However, the presentation is not to be regarded as constituting a restriction of the sphere of patent protection, but instead the embodiments of the invention may vary within the limits defined by the claims.

What is claimed is:

1. A method for damping the vibrations of an m-phase alternating-current motor comprising:
    supplying the motor from an alternating-current source with a supply voltage whose frequency is the basic frequency, in which motor the number of slots per phase is q, and
    feeding the motor with a second voltage having a frequency equal to the basic frequency multiplied by the quantity $2*m*q-1$.

2. The method as defined in claim 1, wherein the second voltage has a phase shift relative to the supply voltage.

3. The method as defined in claim 2, wherein the phase shift between the first and the second voltage is controlled on the basis of the load of the motor and/or to the voltage reference of the motor.

4. The method as defined in claim 1, wherein the amplitude of the second voltage is controlled on the basis of the load of the motor.

5. The method as defined in claim 1, wherein the amplitude of the second voltage is lower than that of the supply voltage.

6. The method as defined in claim 5, measuring to determine the amplitude of the second voltage.

7. The method as defined in claim 1, wherein the supply voltage of the motor is a three-phase voltage and the number of slots per phase in the motor is 1, and that the frequency of the second voltage equals five times the basic frequency.

8. The method as defined in claim 1, generating the second voltage using a separate frequency converter.

9. The method as defined in claim 1, generating the second voltage by having a frequency converter producing the supply voltage also modulated with a modulating wave corresponding to the second voltage, and
    controlling the frequency converter by the modulation thus produced.

10. An apparatus for damping the vibrations of an m-phase alternating-current motor, the motor including a number of slots per phase q, comprising:

a first alternating-current source, and supplying the motor with a first supply voltage whose frequency is a basic frequency, and a second alternating current source supplying a second voltage having a frequency equal to the basic frequency multiplied by the quantity 2*m*q−1.

11. The apparatus as defined in claim 10, further including a second voltage source operatively connected to the second voltage.

12. The apparatus as defined in claim 10, wherein the alternating-current source supplying the basic frequency includes a modulating system, and the voltage producing the second frequency is operatively connected to the basic frequency and the basic frequency and the second frequency are combined so that a combined modulation is formed for controlling the source.

13. The apparatus as defined in claim 10, a controller for controlling the phase shift between the first and second voltage on the basis of the load of the motor.

14. The apparatus as defined in claim 10, the second voltage has an amplitude, which amplitude is controlled on the basis of a load of the motor.

* * * * *